United States Patent
Allmandinger et al.

(10) Patent No.: US 9,784,322 B2
(45) Date of Patent: Oct. 10, 2017

(54) CLUTCH BACKER PLATE WITH RECESSED RIVETS

(71) Applicants: Timothy Bernard Allmandinger, Roanoke, IN (US); Brian William Franke, Hamilton, IN (US); Mark Charles Barnholt, Fort Wayne, IN (US); Stephen Thomas Hamm, Chagrin Falls, OH (US)

(72) Inventors: Timothy Bernard Allmandinger, Roanoke, IN (US); Brian William Franke, Hamilton, IN (US); Mark Charles Barnholt, Fort Wayne, IN (US); Stephen Thomas Hamm, Chagrin Falls, OH (US)

(73) Assignee: Eaton Corporation, Cleveland, OH (US)

( * ) Notice: Subject to any disclaimer, the term of this patent is extended or adjusted under 35 U.S.C. 154(b) by 148 days.

(21) Appl. No.: 14/620,554

(22) Filed: Feb. 12, 2015

(65) Prior Publication Data
US 2015/0159704 A1    Jun. 11, 2015

Related U.S. Application Data

(63) Continuation of application No. 13/891,724, filed on May 10, 2013, now abandoned, which is a continuation-in-part of application No. 13/873,626, filed on Apr. 30, 2013, now abandoned.

(60) Provisional application No. 61/645,885, filed on May 11, 2012.

(51) Int. Cl.
| F16D 13/64 | (2006.01) |
| F16D 69/04 | (2006.01) |
| F16D 13/68 | (2006.01) |
| G06F 11/36 | (2006.01) |
| F16D 69/00 | (2006.01) |

(52) U.S. Cl.
CPC ............. F16D 13/68 (2013.01); F16D 13/64 (2013.01); G06F 11/3604 (2013.01); *F16D 2069/009* (2013.01); *F16D 2069/0433* (2013.01)

(58) Field of Classification Search
CPC .... F16D 13/64; F16D 13/68; F16D 2069/009; F16D 2069/0433
See application file for complete search history.

(56) References Cited

U.S. PATENT DOCUMENTS

| 2,178,527 | A | 10/1939 | Wellman |
| 3,685,623 | A | 8/1972 | Bradshaw |
| 3,761,231 | A | 9/1973 | Dowell et al. |
| 3,946,192 | A | 3/1976 | Allen et al. |
| 4,860,872 | A | 8/1989 | Flotow |
| 5,601,174 | A | 2/1997 | Schulz |
| 6,662,911 | B1 | 12/2003 | Nugier |
| 8,474,588 | B2 | 7/2013 | Franke |
| 2004/0040796 | A1 | 3/2004 | Pham |
| 2013/0299301 | A1 | 11/2013 | Allmandinger et al. |
| 2013/0299302 | A1 | 11/2013 | Allmandinger et al. |

*Primary Examiner* — Richard Lorence
(74) *Attorney, Agent, or Firm* — Ernest E. Helms

(57) ABSTRACT

A driven disc assembly is provided. The backing plates have right angle depression sections that surround mounting holes of a clutch disc. The thickness of the backing plates are enlarged from their normal thickness causing a top surface of the backing plates to axially clear heads of conventional rivets. The thickness of the friction buttons on the backing plates can then be reduced to their minimal effective use thickness.

1 Claim, 6 Drawing Sheets

CLUTCH BACKER PLATE WITH RECESSED RIVETS

CROSS-REFERENCE TO RELATED APPLICATIONS

This application is a Continuation of U.S. patent application Ser. No. 13/891,724, filed May 10, 2013 which is a Continuation-In-Part of U.S. patent application Ser. No. 13/873,626, filed Apr. 30, 2013 which claims priority to U.S. Provisional Patent Application No. 61/645,885, filed May 11, 2012. The disclosures of the above noted applications are incorporated herein by reference.

FIELD OF THE INVENTION

The field of the present invention is that of friction or driven disc assemblies. The present invention is particularly applicable in driven disc assemblies in clutches utilized to selectively connect an engine of a motorized vehicle with a transmission of the motorized vehicle, especially vehicles such as large trucks.

BACKGROUND OF THE INVENTION

Many large motorized vehicles have a clutch assembly to selectively connect an engine of the vehicle with the vehicle transmission. The workings of such a clutch assembly can be discovered by a review of U.S. patent application Ser. No. 12/807,971, Franke, entitled Dry Clutch Having Solid Lubricant Friction Stabilization Inserts, filed Sep. 17, 2010 (the disclosure of which is incorporated by reference herein). Referring to FIGS. 1, 7 and 11, a conventional driven disc assembly 9 includes a disc member 11. The disc member 11 is torsionally connected with a damper unit 13 which spring dampens torsional vibrations delivered to an input shaft of a transmission. The disc member 11 is typically a thin metallic plate having along it's periphery a series of blades or wings 15. The wings 15 on opposing faces have connected thereto a friction pad 17. The friction pad 17 consists of a backing plate 19 with a connected friction material, commonly a ceramic friction material 21. The friction material 21 is referred to as the button in many applications. The friction pads 17 are connected to the friction disc 11 by a series of flathead semi-tubular rivets 23. Referring the addition to FIG. 11, the flathead semi-tubular rivets 23 have a purchased head 25 and a peened head 27 formed by an assembly operation.

The overall axial width 29 (adjacent its outer diameter) of the driven disc assembly 9 based upon the design of the driven disc assembly 9 and a clutch intermediate plate and/or clutch cover assembly that the driven disc assembly interacts with. The overall axial width (sometimes also referred to as height) of the buttons 21 is determined by two factors. The first factor is the expected wear life of the button and is determined by a dimension 31. The second dimension is a dimension 33 that is a width of the friction material on the backing plate required for clearance of the rivet head 27 (or on the other side 25). Accordingly, the amount of friction material of a width 33 is essentially wasted material that cannot be utilized. Typically, the ceramic material making up the button is a very expensive material that typically far exceeds the cost of the backing plate 19. The backing plate is typically a metallic material.

One attempt to eliminate or to make more use wasted button material is provided in FIGS. 6 and 10. In FIGS. 6 and 10, a recessed rivet driven disc assembly 41 is provided. In the driven disc assembly 41, the backing plates 43 have adjacent to the rivet holes recesses 45. Because of the recesses 45, a specialty axially shortened rivet 47 is utilized. The driven disc assembly 41 in FIGS. 6 and 10 does provide an advantage of shortening the rivet, allowing a greater portion of the buttons 48 to be utilized. However, since the overall thickness 29 of the driven disc assembly is determined by other design criteria, the recessed design of driven disc assembly 41 mandates even thicker buttons 48 (to achieve an overall axial thickness 29) thereby providing a button with more excess material which cannot be utilized (due to clutch design) and thereby increasing driven disc assembly cost.

Referring to FIGS. 2 through 5 and 9, an alternative design driven disc assembly 61 has been put forth. Driven disc assembly 61 has an overall axial width 29. In driven disc assembly 61, the disc 11 can be utilized. Driven disc assembly 61 has a backing plate 63 that has an elevated flat section 67 that is elevated by a series of dimple mounds 69. The dimple mounds 69 raise an outer surface of the backing plate 63 outward so that the button 71 can have an effective thickness 31 thereby eliminating the non-utilized thickness 33 of the button in the conventional used driven disc assembly 9. Although this design did provide the advantages desired in reduction of friction material utilized, the non-flat contact between the section 67 of the backing plate with the disc caused the backing plate 63 to buckle due to the lack of adequate heat transfer from the backing plate 63 to the disc 11.

It is desirable to provide a driven disc assembly wherein the thickness of the friction button can be reduced to its effective use to minimize the costs of the driven disc assembly without compromising operational performance.

SUMMARY OF THE INVENTION

To meet the above-noted and other desires, a revelation of the present invention is brought forth. The present invention brings forth a driven disc assembly wherein the clutch disc has holes aligned for connection of the backing plates. The backing plates have right angled depression sections surrounding the backing plate holes. The thickness of the backing plates are enlarged from their normal thickness causing a top surface of the backing plates to axially clear the head of a conventional rivet. The thickness of the friction buttons can then be reduced to their minimal effective thickness.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
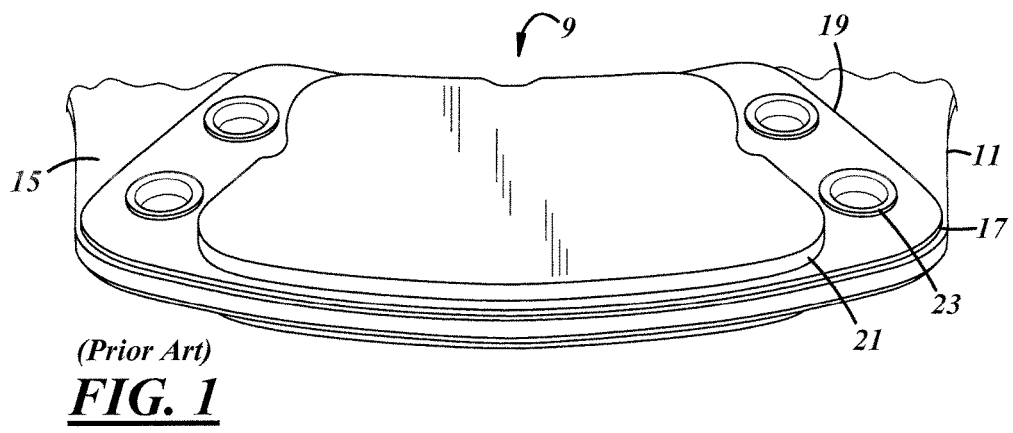
FIG. 1 is a partial perspective view of a conventional driven disc assembly.
Figure 2:
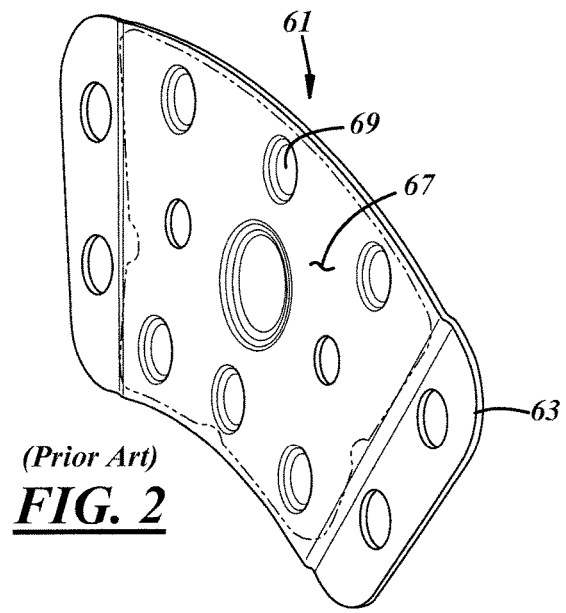
FIG. 2 is a perspective view of a prior art backing plate having a dimple or quilted surface which is an alternative to a backing plate shown in FIG. 1.
Figure 3:
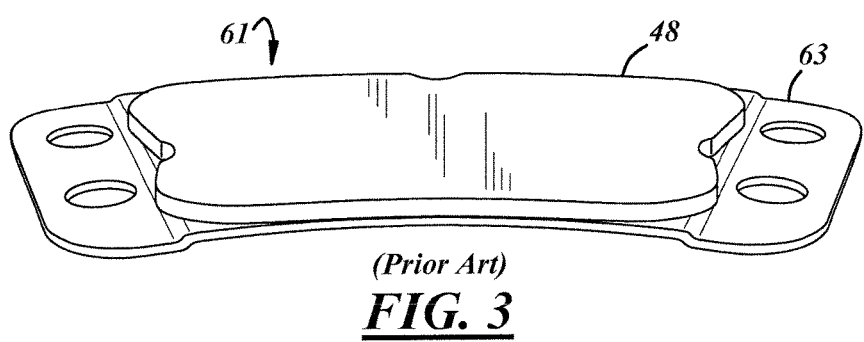
FIG. 3 is another perspective view of the same backing plate shown in FIG. 2.
Figure 4:
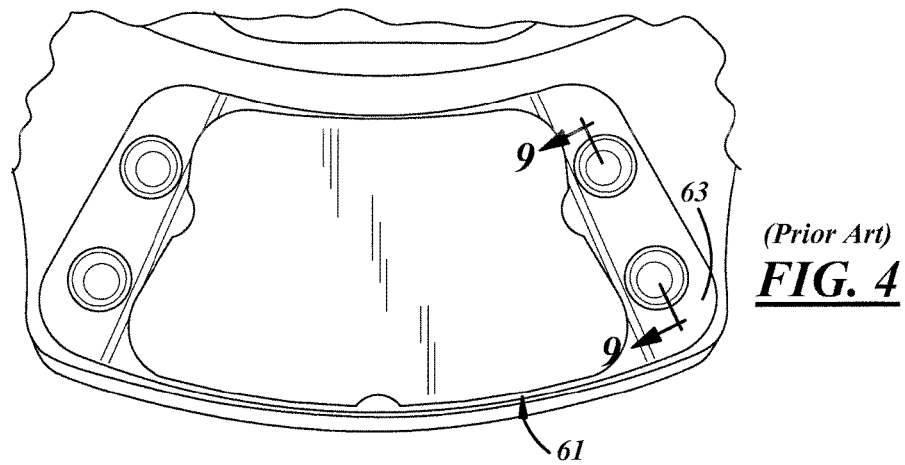
FIG. 4 is a partial perspective view of the backing plate shown in FIGS. 2 and 3 assembled to a disc to partially illustrate a driven disc assembly.
Figure 5:
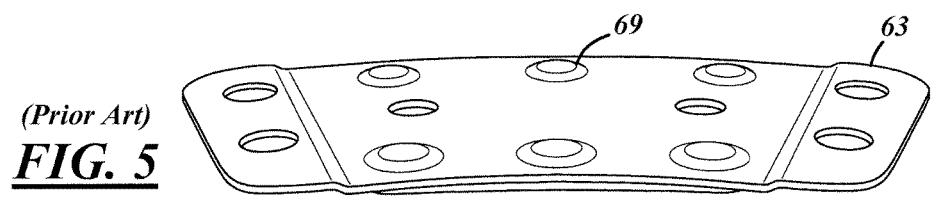
FIG. 5 is a view of a backing plate shown in FIGS. 2-4 wherein the backing plate is turned upside down to illustrate its dimples.
Figure 6:
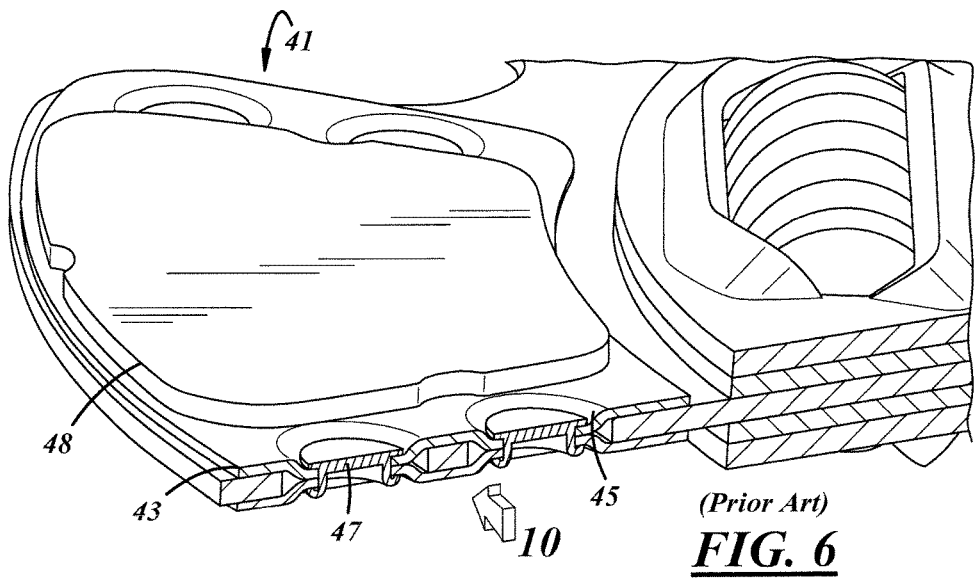
FIG. 6 is a perspective view shown partially in section of a prior art driven disc assembly which is an alternative to the conventional driven disc assembly shown in FIG. 1.
Figure 7:
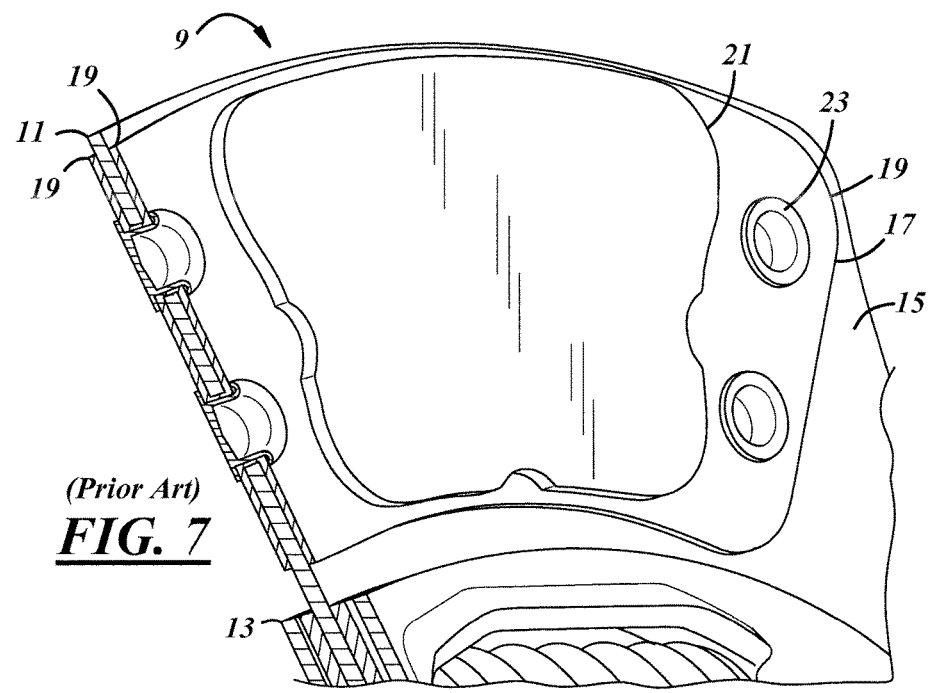
FIG. 7 is a perspective view partially sectioned of the conventional driven disc assembly shown in FIG. 1.
Figure 8:
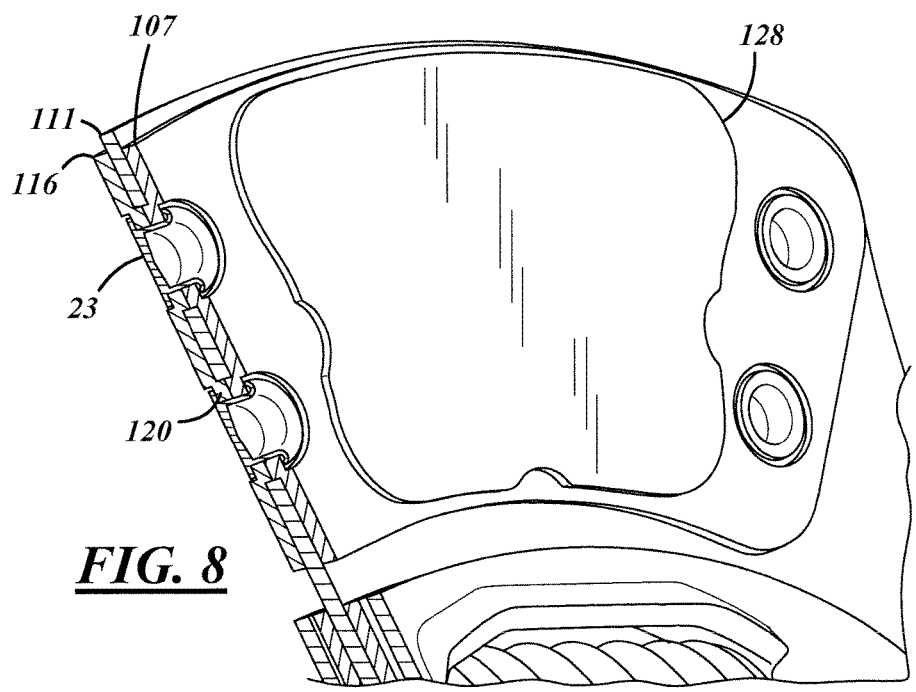
FIG. 8 is a perspective view of a preferred driven disc assembly accordingly to the present invention.
Figure 9:
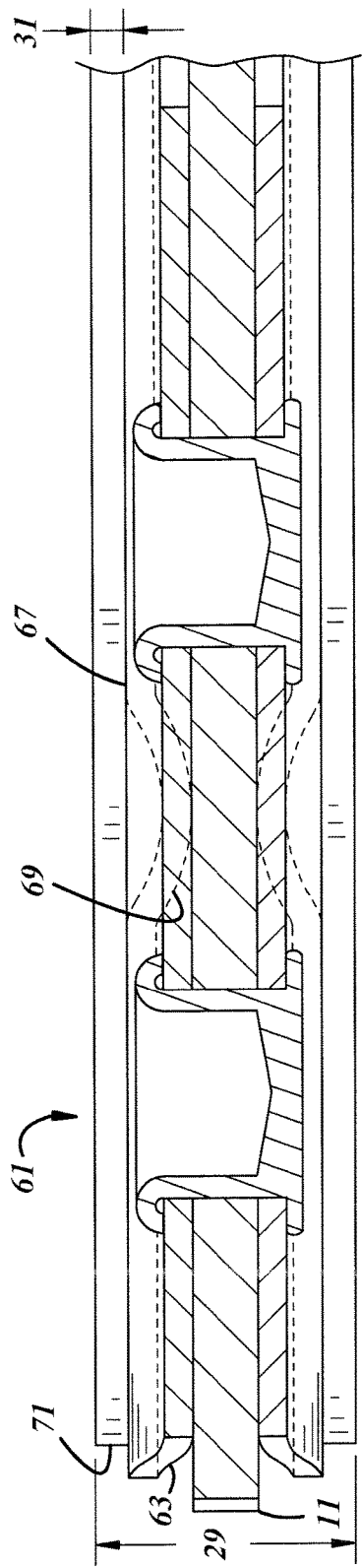
FIG. 9 is a sectional view of the driven disc assembly shown in FIGS. 2-5.
Figure 10:
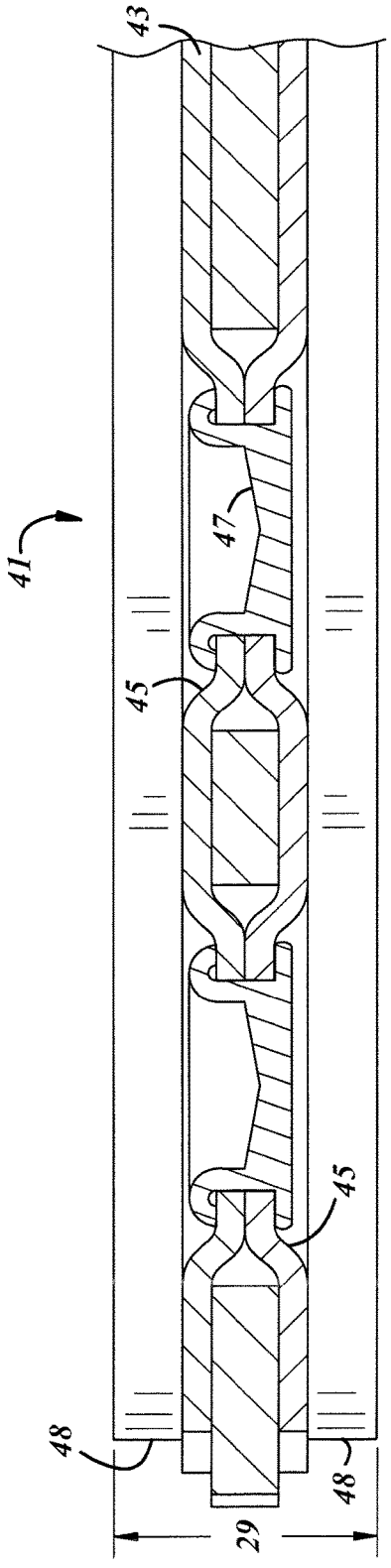
FIG. 10 is a sectional view of the driven disc assembly shown in FIG. 6.
Figure 11:
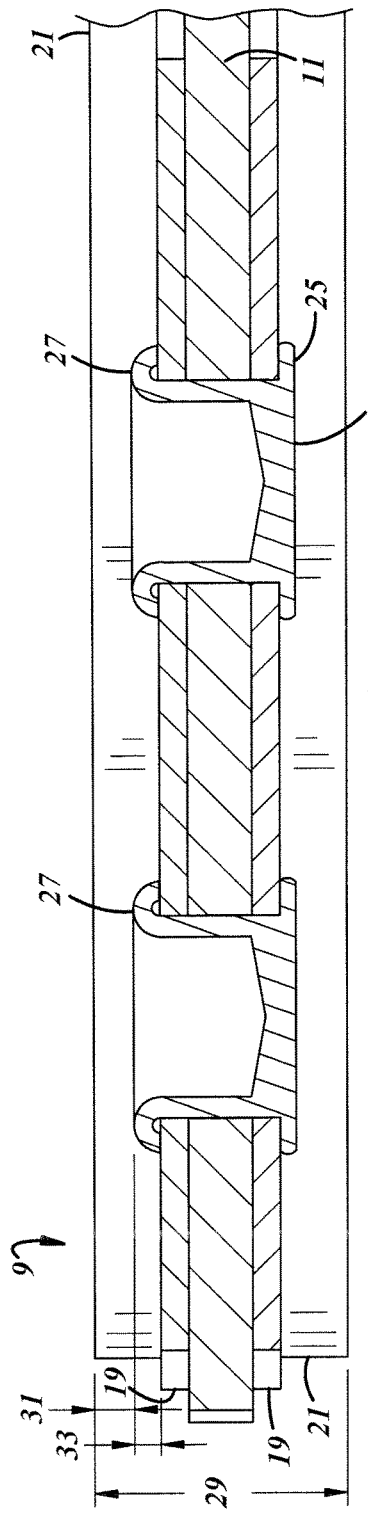
FIG. 11 is a sectional view of a conventional driven disc assembly shown in FIGS. 1 and 7.
Figure 12:
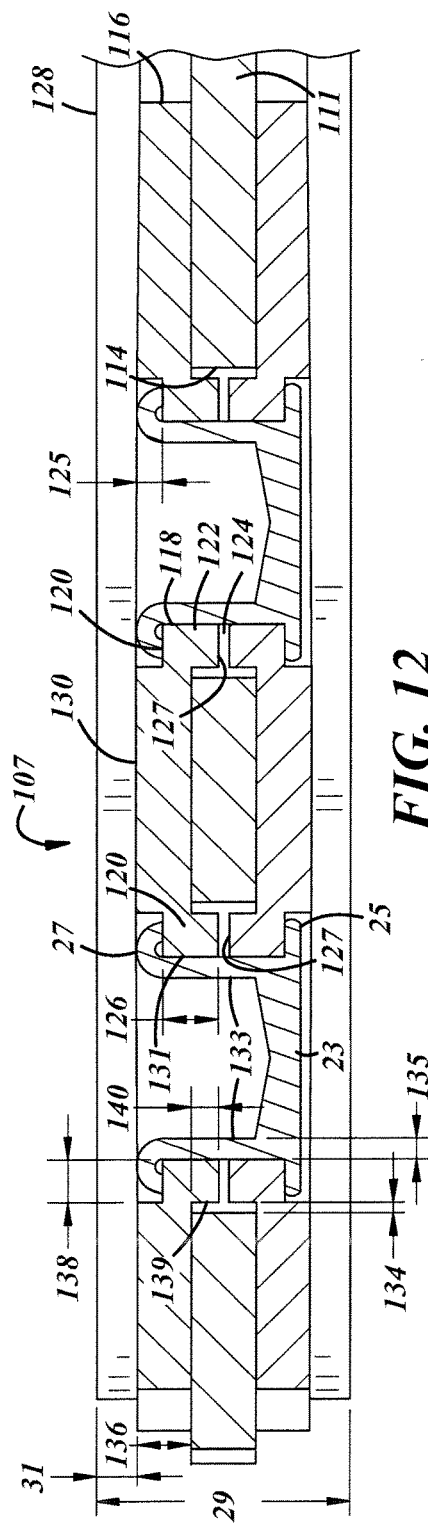
FIG. 12 is an enlarged side sectional view of the preferred embodiment driven disc assembly shown in FIG. 8.

Referring to FIGS. 8 and 12, an inventive low profile button dual face clutch friction plate or disc driven assembly 107 has an overall axial width 29. The disc driven assembly 107 has a disc 111. The disc 111 has a series of mounting holes 114, which are enlarged in comparison to the mounting holes shown formed in the disc drive assembly 9 disc 11. However, in other aspects, the disc 111 is essentially identical to the disc 11. A backing plate 116 is provided which typically has a greater thickness 136 (typically a total thickness between 0.080 and 0.110 inches) than the backing plates previously described. The backing plate 116 has a mounting hole 118. Hole 118 is smaller in diameter then the disc hole 114 and is aligned therewith. The hole 118 is surrounded by a right angle depression section formed by a stamped semi-pierced section 120. The semi-pierced section 120 has an axial displacement thickness 125. The axial displacement thickness 125 is less than an axial thickness 31 of the button 128. An axially inner section 122 of the semi-pierced section 118 is inserted within the clutch disc holes 114. There is an axial gap 124 between inner axially extreme portions 127 of the opposing backing plates. A lateral abutting contact thickness 126 of the semi-pierced section to the rivet 23 is greater than the thickness 31 (typically between 0.040 and 0.075 inches) of the friction button 128. Due to the increased thickness of backing plates 116, the backing plates 116 provide a major flat surface section 130 in adjacent contact with the friction button 128 that is beyond or above the heads 27 or 25 of the rivets 23 (identical to the rivets 23 utilized in the driven disc assembly 9 shown in FIG. 11). The gap 124 between the extreme axially extreme ends 127 of the backing plates ensure that the rivets hold the two backing plates 116 in maximum tension after assembly to the disc 111.

Between the semi-pierced section 120 of the backing plates and the mounting hole 114 of the disc is an installation gap 134. The installation gap is primarily to ensure the proper clearance needed for the assembly operation. The semi-pierced section 120 has an abutting lateral contact interface 131 with a tubular portion 133 of the rivet. The length of the lateral abutting contact of the semi-pierced section with the rivet noted as width 126 is greater than the width 31 of the button 128. The contact section 120 along its outer diameter has an abutting lateral interface 139 of an axial width 140. The axial width 140 in most instances will be at least equal or greater than the width 31 of the button minus 0.035 inches (or the width of the button 128 is no more than 0.035 inches more than that of the width 140) and in most applications will be between 0.040 to 0.055 inches in total width. The radial width 138 of the semi-pierced portion in most instances will be greater than the radial width 135 of the tubular wall 133 of the rivet. Due to the lateral interface 139 of the semi-pierced portions 120 with the disc hole 114 and also due to the fact that the radial width 138 of the semi-pierced portion 120 is greater than the radial width 135 of the tubular wall of the rivet, the sheer strength of the connection of the backing plate 116 to the disc 111 is significantly greater than the sheer strength of the connection of the backing plates 19 to the disc 11 of the driven disc assembly 9 which is the conventional design.

Figure 13:
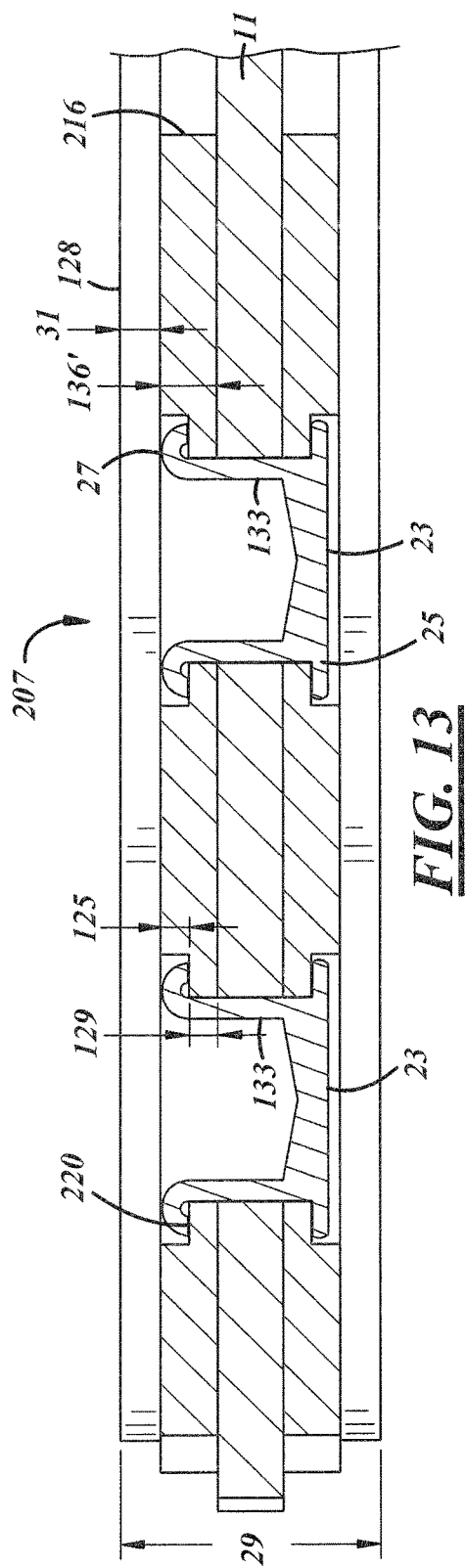
FIG. 13 is an enlarged side sectional view of an alternate preferred embodiment dry disc assembly.

Referring to FIG. 13, disc driven assembly 207 has buttons 128 with an axial width 31 in a manner similar or identical to disc driven assembly 107 described in FIG. 12. Additionally, disc driven assembly 207 has an overall axial thickness 29 and utilizes a disc 11 identical to the disc 11 described in FIG. 11 for the conventional disc driven assembly 9 and also utilizes rivets 23 identical to those utilized for disc driven assemblies 9 and 12. The disc driven assembly 207 has backer plates 216 with right angle depressions 220 having an axial displacement thickness 125 which is typically less than the axial thickness 31 of the button 128. The backer plates have a thickness 136' which typically is close or identical to thickness 136 of driven disc assemblies 116 of driven disc assembly 107. The backer plate 216 has lateral contact with the tubular portion 133 of the rivet of an axial thickness 129 that is typically less than the axial thickness 31 of the button 128. The heads 25 and 27 of the rivets 23 axially capture the right angle depressions 220 of the backing plates 216 together to form the driven disc assembly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A low profile button dual face clutch friction plate comprising:
    a clutch disc having mounting holes formed therein;
    opposing backing plates for connection with said disc, said backing plates having a major flat surface section adjacent said disc, said backing plates having holes with a common diameter aligned with said disc mounting holes, said backing plates having right angle depression sections surrounding said backing plates holes and said backing plates have a thickness between 0.080 and 0.110 inches;
    flathead semi-tubular rivets having tubular bodies closely adjacent said holes of said backing plates with heads axially capturing said right angle depression sections of said backing plates;
    a friction button on each backing plate said friction button having a thickness less than a thickness of one of said backing plates and wherein said button has a thickness between 0.040 and 0.075 inches; and wherein a lateral contact of said right angle depression section of said backing plate with said rivet is less than said thickness of said button and wherein axial displacement thickness of said right angle depression is less than said thickness of said button.

* * * * *